[19] United States Patent
Hardtmann

[11] 3,886,161
[45] May 27, 1975

[54] 2-PIPERAZINO-3-CYANO-5-PHENYL-PYRIDINES

[75] Inventor: Goetz E. Hardtmann, Florham Park, N.J.

[73] Assignee: Sandoz, Inc., E. Hanover, N.J.

[22] Filed: Oct. 18, 1972

[21] Appl. No.: 298,600

Related U.S. Application Data

[63] Continuation-in-part of Ser. No. 98,124, Dec. 14, 1970, Pat. No. 3,717,645, which is a continuation of Ser. No. 42,540, June 1, 1970, Pat. No. 3,660,415.

[52] U.S. Cl. .... 260/268 H; 260/293.69; 260/294.9; 424/250
[51] Int. Cl............................................ C07d 51/70
[58] Field of Search...................... 260/268 H, 294.9

Primary Examiner—Donald G. Daus
Assistant Examiner—Jose Tovar
Attorney, Agent, or Firm—Gerald D. Sharkin; Richard E. Vila

[57] ABSTRACT

The invention discloses pyridines substituted at the 2-position and also having an aryl substituent at the 5-position and cyano at the 3-position, e.g. [3-cyano-5-(p-chlorophenyl)-2-pyridyloxy]acetic acid ethyl ester and 5-phenyl-2-dimethylaminoethylamino-nicotinonitrile. Such pyridine derivatives are useful as pharmaceutical agents, e.g. as anti-inflammatory agents. The compounds may be prepared by reacting a 2-halo-5-aryl-nicotinonitrile with the appropriate derivative of the substituent desired at the 2-position according to established procedures.

2 Claims, No Drawings

2-PIPERAZINO-3-CYANO-5-PHENYL-PYRIDINES

This application is a continuation-in-part of copending application Ser. No. 98,124, filed Dec. 14, 1970, now U.S. Pat. No. 3,717,645, which Ser. No. 98,124 in turn is a continuation of application Ser. No. 42,540, filed June 1, 1970 and now U.S. Pat. No. 3,660,415.

The present invention relates to pyridine derivatives, and more particularly to 2-substituted-pyridines also substituted at the 5-position by aryl and at the 3-position by cyano. The invention also relates to pharmaceutical compositions and methods utilizing the pharmacological properties of such pyridine derivatives.

The compounds of the present invention may be represented structurally by the following formula I:

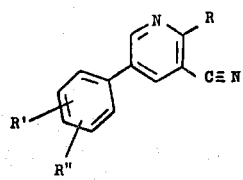

wherein
  R is lower alkoxy of 1 to 6 carbon atoms, allyloxy, methallyloxy, propargyloxy,

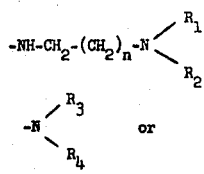

$-O-(CH_2)_n-COOR°$
  each of $R_1$ and $R_2$ is lower alkyl of 1 to 3 carbon atoms,
  each of $R_3$ and $R_4$ is lower alkyl of 1 to 3 carbon atoms, or together with the nitrogen atom to which they are attached form a saturated heterocyclic ring selected from the group of N-pyrrolidyl, N-piperidyl and

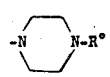

R° is hydrogen or lower alkyl of 1 to 4 carbon atoms,
  n is 1 to 3, and
  each of R' and R" is independently hydrogen, halo of atomic weight of from 19 to 80, preferably chloro, or lower alkoxy of 1 to 3 carbon atoms, preferably methoxy.

The compounds of the formula I having the formula I-A:

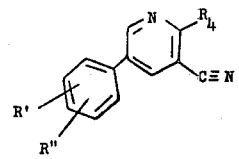

wherein R' and R" are as above defined and $R_3$ is alkoxy of 1 to 6 carbon atoms, allyloxy, methallyloxy, propargyloxy or $-O-(CH_2)_n-COOR°$ and n is as defined and $R_1°$ is lower alkyl of 1 to 4 carbon atoms, are preferably prepared in a Step A reaction involving subjecting a compound of the formula II:

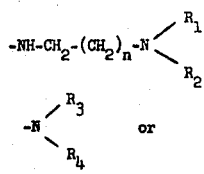

wherein R' and R" are as defined and X is chloro or bromo, to reaction with a compound of the formula III:

$$M-R_3 \qquad \text{III}$$

wherein $R_3$ is as defined and M is a metal cation, preferably an alkali metal such as sodium or potassium.

The compounds of the formula I having the formula I-B:

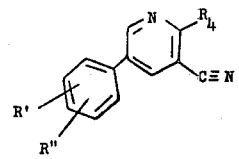

wherein R' and R" are as defined and $R_4$ is

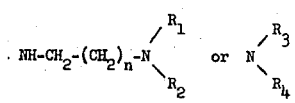

and $R_1$, $R_2$, $R_3$, $R_4$ and n are as defined, are preferably respectively prepared in a Step B reaction involving subjecting a compound of the formula II to reaction with a compound of formula IV-A or IV-B:

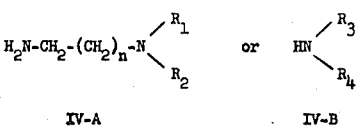

wherein $R_1$, $R_2$, $R_3$, $R_4$ and n are as defined.

The compounds of formula I having the formula I-C:

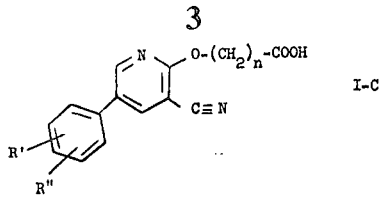

wherein R' and R'' are as defined, are preferably prepared in a Step C reaction involving subjecting a compound of the formula I-D:

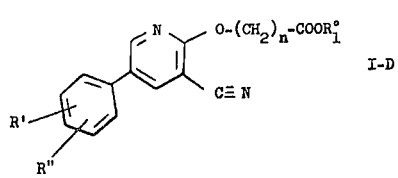

wherein R' and R'' are as defined and $R_1^\circ$ is lower alkyl of 1 to 4 carbon atoms, to hydrolysis in a known manner.

The preparation of compounds of the formula I-A by the reaction of Step A may be suitably carried out at temperatures in the range of from 10° to 100°C., preferably 15° to 60°C. The reaction is conveniently carried out in an inert solvent medium which may be provided by employing any of several of the conventional organic solvents such as the aromatic solvents, e.g., benzene. There may also be employed as the solvent medium the alcohols which represent the corresponding alcoholic analogues of $R_3$ in the compounds of formula I-A. In such situations the alcohols are the corresponding analogue of $R_3$ and thus useful in forming the compound of formula III, e.g., allyl alcohol when $R_3$ is allyloxy. The reaction product of formula I-A may be obtained from the reaction mixture of the Step A reaction by working up by established procedures.

The preparation of compounds of the formula I-B by the reaction of Step B may be suitably carried out at temperatures in the range of from 10° to 140°C., preferably 15° to 100°C. The reaction is conveniently carried out in an inert liquid medium which may be provided by employing an excess of a compound IV-A or IV-B when it is liquid or liquified under the reaction conditions and/or by employing an inert organic solvent of known type. The latter may be any of the several conventional organic solvents including by way of illustration the lower alkanols such as ethanol, the aromatic solvents such as benzene, the ethers of both non-cyclic and cyclic types such as dimethoxyethane and tetrahydrofuran and the well known amides such as dimethylacetamide, dimethylformamide and the like. A preferred solvent of conventional type is ethanol. The reaction product of formula I-B may be obtained from the reaction mixture of the Step D reaction by working up by conventional procedures.

The preparation of compound I-C by the reaction of Step C may be carried out in a conventional manner for the hydrolysis of an ester to an acid and may be effected accordingly either in the presence of a dilute aqueous acidic medium or by saponification in the presence of a dilute solution of a strong base followed by acidification in a known manner. The reaction may be suitably carried out at temperatures in the range of 5° to 100°C., preferably 15° to 60°C. The reaction is desirably effective in an inert organic solvent medium preferably provided by employing a water miscible organic solvent of known type such as a lower alkanol, e.g., methanol and ethanol. The reaction of Step C is preferably effected by saponification employing an alkali metal hydroxide such as sodium hydroxide or potassium hydroxide followed by acidification with a strong inorganic acid such as hydrochloric acid. The reaction product may be obtained from the reaction mixture of the Step C reaction by working up by conventional procedures.

The compounds of the formulae III, IV-A and IV-B are either known or may be prepared from known materials by established procedures. The compounds of the formula II are also of a known type and preferably prepared by subjecting in a Step 1 reaction a compound of the formula V:

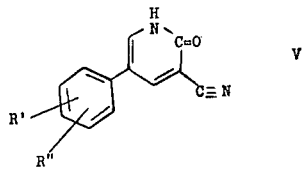

wherein R' and R'' are as defined, to halogenation in a known manner.

The preparation of compounds of formula II by halogenation of a compound V may be effected by known procedures for halogenation of a cyclic carbonyl function. The preparation is preferably carried out at elevated temperatures in the range of 50° to 150°C., more usually 80° to 120°C. using a phosphorous oxyhalide as the halogenating agent, more preferably phosphorus oxychloride. The corresponding phosphorus pentahalide may be suitably employed as a co-reactant. The reaction is preferably carried out in an inert liquid medium which may be conveniently provided by employing an excess of the phosphorous oxyhalide. Conventional organic solvents inert under the reaction conditions may also be employed including, for example the chlorine-containing solvents such as methylene chloride. The reaction product of formula II may be recovered from the reaction mixture of Step 1 by working up by known procedures.

The compounds of formula V employed as starting material in the preparation of compounds II are either known per se or may be prepared from known materials by established procedures. A preferred method for preparation of compounds V is illustrated hereinafter in Example 1.

Various of the compounds of formula I such as those of formula I-B may be formed as acid addition salts and the pharmaceutically acceptable acid addition salts thereof are included within the scope of the compounds of the formula I of this invention. Such acid addition salts include, by way of illustration, the hydrochloride, maleate and methanesulfonate. The acid addition salts may be produced from the corresponding free bases by conventional procedures. Conversely, the free bases may be obtained from the acid addition salts by standard procedures.

The compounds of formula I are useful because they possess pharmacological activity in animals. In particular, the compounds I are useful as anti-inflammatory agents as indicated by the adjuvant arthritis test in rats using *Mycobacteria butyricum* in Freund's adjuvant. For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about 0.5 milligram to about 150 milligrams per kilogram of body weight, preferably given in divided doses 2 to 4 times a day, or in sustained release form. For most mammals the administration of from about 30 milligrams to about 1000 milligrams of the compound per day provides satisfactory results and dosage forms suitable for internal administration comprise from about 8 milligrams to about 500 milligrams of the compound in admixture with a solid or liquid pharmaceutical carrier or diluent.

For the above usage, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules preferably contain the active ingredient admixed with an inert solid diluent, e.g., calcium carbonate, calcium phosphate and kaolin. The preferred pharmaceutical compositions from the standpoint of preparation and ease of administration are solid compositions, particularly solid diluent-filled capsules and tablets.

A representative formulation is a tablet prepared by conventional tabletting techniques and containing the following ingredients:

| Ingredient | Weight (mg.) |
| --- | --- |
| [3-cyano-5-(p-chlorophenyl)-2-pyridyloxy]acetic acid ethyl ester | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. Such examples are for purposes of illustration only.

EXAMPLE 1

[3-Cyano-5-(p-chlorophenyl)-2-pyridyloxy]acetic acid ethyl ester

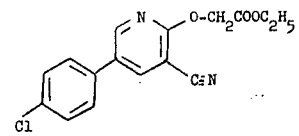

Step A: Preparation of 2-(p-chlorophenyl)-3-dimethylaminoacrolein

At temperature of 20°–30°C an amount of 81 g. of dimethylformamide is added dropwise to 138 g. of phosphorous oxychoride with external cooling. The mixture is stirred for 15 minutes at room temperature after which period a solution of 50 g. p-chlorophenylacetic acid is added and the mixture heated to 65°–75°C. for 20 hours. The reaction mixture is cooled, poured onto 1 kg. of ice and made basic with 50% NaOH (ice cooling) until pH 12. The mixture is then heated on a steambath for 1 hour. The precipitate which forms is filtered off and washed with a large amount of water. The wet material is dried in vacuo and then crystallized from ethyl acetate to obtain 2-(p-chlorophenyl)-3-dimethylaminoacrolein, m.p. 117°–120°C.

Step B: Preparation of 3-cyano-5-p-chlorophenyl-2(1H)-pyridone

A solution of 7 g. of sodium in 300 ml. of methanol is stirred while a solution of 16 g. of 2-cyanoacetamide and 37 g. of 2-p-chlorophenyl-3-dimethylaminoacroleine in a little methanol is added. The mixture is refluxed for 1 hour and the resulting precipitate is filtered off, washed with ethanol, dissolved in hot water and the solution acidified. The resulting precipitate is filtered off and washed with water to obtain 3-cyano-5-p-chlorophenyl-2(1H)-pyridone, m.p. 278°–280°C.

Step C: Preparation of 2-chloro-5-p-chlorophenylnicotinonitrile

To a solution of 17 g. of 3-cyano-5-p-chlorophenyl-2(1H)-pyridone in 40 ml. of phosphorus oxychloride is added 18 g. of phosphorus pentachloride and the mixture refluxed for 48 hours. The phosphorus oxychloride is evaporated and the residue is treated with a large amount of ice (in order to destroy the excess phosphorus pentachloride and some phosphorus oxychloride). A yellowish precipitate is formed, filtered off and dissolved in chloroform. The chloroform solution is extracted with water, dried and evaporated in vacuo to obtain 2-chloro-5-p-chlorophenylnicotinonitrile, m.p. 176°–180°C.

Step D: Preparation of [3-cyano-5-(p-chlorophenyl)-2-pyridyloxy]acetic acid ethyl ester A solution of 6 g. of ethyl glycolate in 150 ml. of benzene is stirred and 2.5 g. of sodium hydride (57% in mineral oil) is added in portions. The mixture is then to be stirred for an additional 15 minutes and 10 g. of 2-chloro-5-p-chlorophenylnicotinonitrile is added and the reaction mixture is stirred for 18 hours at room temperature. Water is then added to the reaction mixture and the phases separated. The organic phase is extracted 3 times with water, dried and evaporated in vacuo. The residue is crystallized from chloroform/pentane and recrystallized from chloroform/diethyl ether/pentane to obtain [3-cyano-5-(p-chlorophenyl)-2-pyridyloxy]acetic acid ethyl ester, m.p. 124°–126°C.

EXAMPLe 2

[3-Cyano-5-(p-chlorophenyl)-2-pyridyloxy]acetic acid

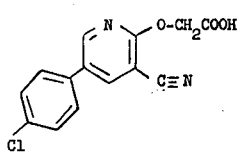

A suspension of 5 g. of [3-cyano-5-(p-chlorophenyl)-2-pyridyloxy]acetic acid ethyl ester and 16 ml. of 1N. sodium hydroxide in 100 ml. of methanol is stirred for 10 hours at room temperature. A clear solution results and the methanol is evaporated in vacuo and insoluble material is filtered off and discarded. The filtrate is acidified with 2 N. hydrochloric acid and the resulting mixture is extracted twice with ethyl acetate. The organic phase is extracted repeatedly with water, dried and evaporated in vacuo. The residue is crystallized from methanol/water to obtain [3-cyano-5-(p-chlorophenyl)-2-pyridyloxy]acetic acid, m.p. 175°–178°C.

EXAMPLE 3

Following the procedure of Example 1 the following compounds of the invention are prepared:
a. [3-cyano-5-phenyl-2-pyridyloxy]acetic acid ethyl ester, m.p. 121°–125°C. (Crystallized from methylene chloride/diethyl acetate/pentane.
b. 5-p-chlorophenyl-2-allyloxy-nicotinonitrile, m.p. 96°–100°C. (Crystallized from ethyl acetate)
c. 5-phenyl-2-N-pyrrolidyl-nicotinonitrile.
d. 5-p-chlorophenyl-2-diethylamino-nicotinonitrile.

EXAMPLE 4

Following the procedure of Example 2 the following compound of the invention is prepared:
a. [3-cyano-5-phenyl-2-pyridyloxy]acetic acid, m.p. 172°–175°C. (Crystallized from methanol/water).

EXAMPLE 5

5-p-chlorophenyl-2-dimethylaminoethylamino-nicotinonitrile

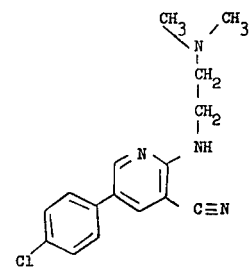

To a suspension of 5 g. of 2-chloro-5-p-chlorophenylnicotinonitrile in 70 ml. of benzene is added 10 ml. of N,N-dimethylaminoethylamine. The resulting mixture is refluxed for 17 hours, cooled, washed with diluent sodium hydroxide solution and then twice with water, dried and evaporated in vacuo. The residue is crystallized from ethyl acetate/pentane to obtain 5-p-chlorophenyl-2-dimethylaminoethylamino-nicotinonitrile, m.p. 113°–118°C.

EXAMPLE 6

Employing the procedure of Example 5 the following compounds of the invention are prepared:
a. 5-phenyl-2-dimethylaminoethylamino-nicotinonitrile, m.p. 97°–102°C. (Crystallized from methanol/pentane).
b. 5-phenyl-2-(4-methylpiperazino)-nicotinonitrile, m.p. 163°–165°C.

What is claimed is:
1. A compound of the formula:

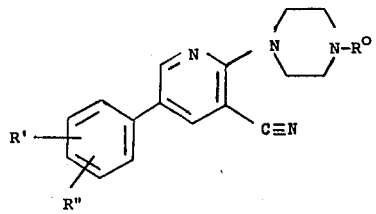

wherein
$R^o$ is hydrogen or alkyl of 1 to 4 carbon atoms, and each of $R'$ and $R''$ is independently hydrogen, halo of atomic weight of from 19 to 80 or alkoxy of 1 to 3 carbon atoms, or
a pharmaceutically acceptable acid addition salt thereof.
2. The compound of claim 1 which is 5-phenyl-2-(4-methylpiperazino)-nicotinonitrile.

* * * * *